United States Patent
Edvardsson (10) Patent No.: US 6,859,166 B2
(45) Date of Patent: Feb. 22, 2005

(54) ANTENNA DEVICE FOR RADAR-BASED LEVEL GAUGING

(75) Inventor: Kurt Olov Edvardsson, Täby (SE)

(73) Assignee: Saab Marine Electronics AB, Gothenburg (SE)

( * ) Notice: Subject to any disclaimer, the term of this patent is extended or adjusted under 35 U.S.C. 154(b) by 0 days.

(21) Appl. No.: 10/309,601

(22) Filed: Dec. 4, 2002

(65) Prior Publication Data

US 2004/0108951 A1 Jun. 10, 2004

(51) Int. Cl.[7] .............................................. G01S 13/08
(52) U.S. Cl. ...................... 342/124; 342/175; 73/290 R
(58) Field of Search ............................... 342/118–124; 73/290 R, 290 B, 304 R, 304 C, 305–322, 322.5, 290 V; 324/644; 340/618; 343/915, 881

(56) References Cited

U.S. PATENT DOCUMENTS

| | | | |
|---|---|---|---|
| 5,233,352 A | * 8/1993 | Cournane | 342/124 |
| 5,734,346 A | * 3/1998 | Richardson et al. | 342/124 |
| 5,926,152 A | 7/1999 | Schneider | 343/915 |
| 6,041,650 A | * 3/2000 | Swindler et al. | 73/317 |
| 6,266,022 B1 | * 7/2001 | Muller et al. | 343/703 |
| 6,310,574 B1 | 10/2001 | Fehrenbach et al. | 342/124 |
| 6,404,382 B2 | 6/2002 | Fehrenbach et al. | 342/124 |
| 6,606,904 B2 | * 8/2003 | Muller et al. | 73/290 V |
| 6,672,155 B2 | * 1/2004 | Muller et al. | 73/290 V |
| 2002/0008659 A1 | 1/2002 | Fehrenbach et al. | 342/175 |
| 2002/0121138 A1 | * 9/2002 | Malzahn | 73/290 R |

FOREIGN PATENT DOCUMENTS

DE    195 00 324 C1    5/1996

OTHER PUBLICATIONS

*Antenna Engineering Handbook*, by R. Johnson, Third Edition; McGraw–Hill 1993, pgs. 10–1–10–59 and 9–1–9–39.

* cited by examiner

*Primary Examiner*—Thomas H. Tarcza
*Assistant Examiner*—Isam Alsomiri
(74) *Attorney, Agent, or Firm*—Westman, Champlin & Kelly, P.A.

(57) ABSTRACT

An antenna device in a radar-based level gauge mounted at an opening in a roof of a tank, the antenna device comprising at least one elongated radiating structure, which has a length that is substantially larger, preferably more than 3–5 times longer, than a maximum cross-sectional length dimension of the opening; is oriented in a non-vertical position; and is configured and fed to produce an essentially vertical radiation beam directed downwards in the tank. Preferably, the antenna device is foldable and is inserted into the tank through the opening and oriented in the non-vertical position by means of folding the radiating structure.

71 Claims, 6 Drawing Sheets

ANTENNA DEVICE FOR RADAR-BASED LEVEL GAUGING

FIELD OF THE INVENTION

The invention relates generally to level gauging, and more specifically the invention relates to antenna devices for use in radar-based level gauging equipment, and to the mounting of such antenna devices.

BACKGROUND OF THE INVENTION AND RELATED ART

Radar-based methods are since several years commonly used for level gauging in various tanks. The antenna devices used for transmitting and receiving the radar signals, are critical parts and a few different antenna types have been employed.

Three basic factors to consider for an antenna for radar-based level gauging are gain, antenna pattern, and size.

The antenna gain, which is closely related to the efficient antenna area, has to be high enough to provide for receiving a sufficiently strong signal echo from the required maximum distance. For a circular antenna the maximum measuring distance is, in the limiting case where the liquid surface is turbulent, proportional to the antenna diameter.

Further, the radiation beam has to be narrow enough to suppress echoes from obstacles in the tank in order to distinguish the echo from the surface of the matter gauged. Since the antenna pattern is also related to the antenna area, the requirement of a narrow radiation beam can, for a circular antenna, be reformulated to a requirement of an antenna having sufficiently large diameter.

Still further, the antenna has typically to be small enough to be inserted through an opening in the roof of the tank while being mounted. Using an opening at some arbitrary position might not be possible since locations where internal tank structures may give disturbing radar echoes have to be avoided. For many tanks, such as tanks containing inflammable liquids there may also be restrictions on having new openings welded, and then a suitable existing opening has to be used.

Obviously, the three requirements may not always be complied with, e.g. when the first two requirements imply an antenna size, which is larger than the only suitable opening.

Typical antennas for radar level gauging are horn, planar, parabolic and rod antennas. When the available tank roof opening is small an end-fire rod antenna or a very small horn antenna is typically used today, or the last one of the three requirements may be removed if the antenna can be mounted from the inside of the tank. This, however, obviously requires a tank environment allowing a person to enter for the necessary mounting work.

The use of a horn antenna for 4" and smaller tank roof holes is described e.g. in U.S. Pat. No. 6,404,382 issued to Fehrenbach et al.

The end-fire rod antenna may typically at 6 GHz be a shaped PTFE-bar having a length of about 300–350 mm and a diameter of about 30 mm or smaller. The antenna has an efficient area, which is larger than the geometrical cross section. The rod antenna roughly corresponds to a 3" horn antenna, which has a 3 dB lobe width of 30°. Due to the end-fire nature of the rod antenna this is hard to improve without using very long rods. The gain of an end-fire antenna is proportional to its length as compared to the gain of a broadside antenna, such as horn or parabolic antenna, which is proportional to the area of the antenna.

Long rods, however, limit the possibility of gauging high levels, i.e. levels close to the roof of the tank, since the lowermost portion of the rod would then be below the surface of the gauged matter.

Another solution is to use a parabolic foldable antenna as described in U.S. Pat. No. 5,926,152 issued to Schneider. For the purpose of introducing the measuring instrument through an opening in the container, the parabolic antenna can be folded and unfolded by being positively moved.

The parabolic foldable antenna as disclosed in said U.S. Pat. No. 5,926,152, however, seems to need a rather large tank roof opening. Further, the foldable parabolic antenna seems to be a complex device, which would be expensive to manufacture.

SUMMARY OF THE INVENTION

A main object of the invention is thus to provide an antenna device for a radar-based level gauge mounted at a relatively small opening in the roof of a tank, which lacks at least some of the problems or limitations as disclosed above when using horn, rod, or foldable parabolic antennas.

A further object of the invention is to provide such antenna device, which is superior to the antenna devices of prior art as identified above in terms of high antenna gain and narrow radiation lobes combined with small size of the antenna device.

In this respect there is a particular object of the invention to provide such antenna device, which is insertable through a 2" hole, or even through a 1" hole. Such holes may be common in typical tanks in process industry while larger holes are few and made for special purposes, i.e. they may not accessible for a new installation.

A yet further object of the invention is to provide such antenna device, which is simple, reliable, efficient, accurate, precise, easy to manufacture and install, and of low cost.

A still further object of the invention is to provide a method for mounting an antenna device for a radar-based level gauge through an opening in the roof of a tank.

These objects, among others, are attained by devices and methods as claimed in the appended claims.

According to a first aspect of the present invention there is provided an antenna device for a radar-based level gauge mounted at an opening in a roof of a tank, wherein the antenna device comprises at least one elongated radiating structure, particularly an antenna array structure or a leaky wave antenna structure. The radiating structure has a length, which is substantially larger, preferably at least 3–5 times larger, than a maximum cross-sectional length dimension of said opening; is oriented in a non-vertical position; and is configured and fed to produce an essentially vertical radiation beam directed downwards in said tank.

As will be discussed in detail the elongated shape allows the creation of a radiation beam, which is narrow in one direction, which has a fairly big efficient antenna area, and which still can be narrow enough to be inserted through a small hole.

The radiating structure may be oriented horizontally, or close thereto, or it may be oriented with an off-vertical angle, which deviates significantly from 0° and from 90°.

Preferably, the antenna device produces a fan-shaped antenna pattern, which at least in one dimension is very narrow.

According to a second aspect of the present invention there is provided a method for mounting the antenna device of the first aspect, comprising the steps of inserting the antenna device into a tank through an opening in a roof thereof; orienting the elongated radiating structure of the antenna device in a non-vertical position; and connecting the antenna device to the radar-based level gauge so that, during use of the radar-based level gauge, the antenna device produces an essentially vertical radiation beam directed downwards in the tank.

Obviously, the radiating structure has to be small enough to be insertable into the tank through the opening. Preferably, the antenna device is foldable for a simplified mounting. Then the antenna device is first inserted into the tank through the opening and thereafter the elongated radiating structure is pivoted to a desired non-vertical position.

The inventor has found that in many situations there are only very few or one single structure that may obstruct the microwave signal in the close-by environment in the tank. Thus, by knowledge of the location of such obstructing structure(s) there may be sufficient that the antenna device produces a microwave beam, which is narrow only in one dimension, if the antenna device is capable of being oriented such that the narrow beam dimension is facing the obstructing structure(s).

For instance, if the radar-based level gauge is to be mounted at an opening close to a side wall of the tank, the antenna device is preferably oriented such that such fan-shaped beam is parallel with the side wall of the tank to avoid interfering echoes from there.

The radar-based level gauges are used to measure levels in tanks, which for the purpose of the present invention include not only large containers but also processing apparatuses such as, for example, reactors, centrifuges, mixers, hoppers, graders, or heat-treatment furnaces and similar devices, which are used in food chemistry, pharmaceutical chemistry, biochemistry, gene chemistry and petrochemistry.

Further characteristics of the invention, and advantages thereof, will be evident from the detailed description of preferred embodiments of the present invention given hereinafter and the accompanying FIGS. 1–6, which are given by way of illustration only, and thus are not limitative of the present invention.

DESCRIPTION OF PREFERRED EMBODIMENTS

Figure 1:
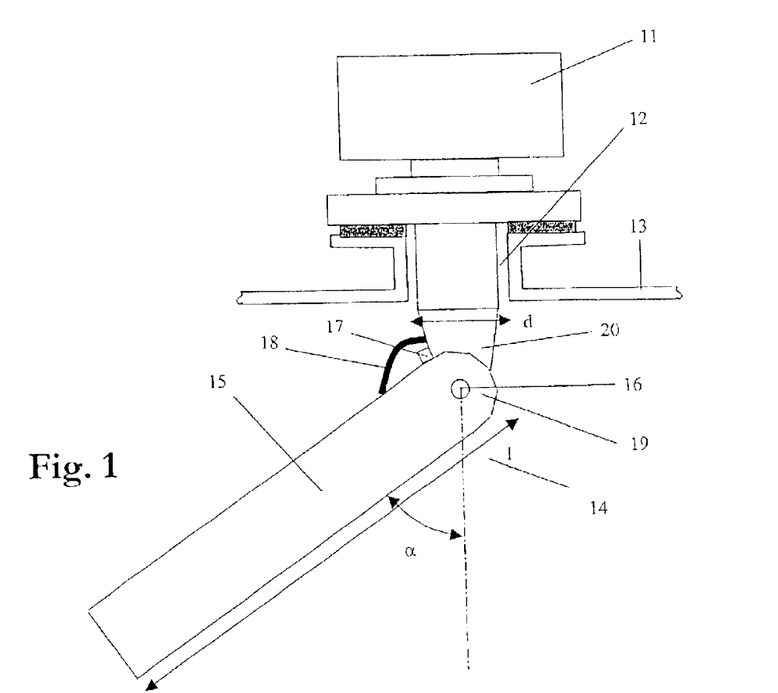
FIG. 1 illustrates schematically, in a side view, a device for radar-based level gauging including an antenna device according to the general principles of the present invention.

With reference to FIG. 1, which schematically illustrates, in a side view, an apparatus aimed for radar-based level gauging, a preferred embodiment of the present invention will be described. The apparatus may be a frequency modulated continuous wave (FMCW) radar apparatus, a pulsed radar apparatus, or any other type of distance measuring radar.

Many frequencies can be used for radar level gauging but bands close to 5.8, 10 and 25 GHz have been used so far. In tanks where foam and contamination are frequent the lowest one of said frequencies is most common since the microwave signal at this frequency is much less sensitive for such degradations. The present invention is particularly useful for this frequency, or even lower frequencies, as it is difficult to obtain a narrow radiation beam with a conventional antenna solution.

The radar-based level gauge, denoted by 11 in FIG. 1, is mounted above an opening 12 of a roof 13 of a tank or container filled with matter, the level of which being to be gauged. The opening may be circular and have a diameter d of 2", or even 1". The radar-based level gauge transmits a microwave signal via an antenna device 14 towards the surface of the matter in the tank, and receives the microwave signal, preferably by the same antenna device 14, as reflected against the surface of the matter in the tank. Further, the radar-based level gauge comprises, or is connected to, a signal processing device (not explicitly illustrated) for calculating from the propagation time of the transmitted and reflected microwave signal the level of the matter in the tank.

According to the present invention the antenna device 14 comprises an elongated radiating structure 15, which has a length l, which is substantially larger than the diameter d of the opening 12 in the roof 13 of the tank. Further, the elongated radiating structure 15 is oriented in a non-vertical position, but is configured and fed to produce an essentially vertical radiation beam directed downwards in the tank.

The term non-vertical position is in the present patent document used for denoting a radiating structure orientation, where the longitudinal extension of the radiating structure is not parallel with a symmetry axis of the essentially vertical radiation beam, but deviates more from a vertical direction. By the expression essentially vertical radiation beam directed downwards in the tank is here meant a radiation beam which is directed downwards vertically, or at least sufficiently close to vertically to be capable of, by said antenna device, receiving microwaves from the radiation beam after having been reflected at the surface of the matter in the tank, the level of which being gauged. Typically, the symmetry axis of the radiation beam deviates from the vertical direction by an angle smaller than half the antenna beam width.

Preferably the elongated radiating structure is oriented with an angle α with respect to the vertical direction, which deviates significantly from 0°. It may be more than about 5°, more than about 10°, more than about 15°, more than about 20°, more than about 25°, more than about 30°, more than about 35°, more than about 40°, or more than about 45°. Further, the angle α may deviate slightly or significantly from 90°. In another version, the radiating structure is oriented in or close to a horizontal position, i.e. the angle α is close to 90°.

Preferably, the length l of the radiating structure 15 is larger than three times, more preferably larger than four times, and most preferably larger than five times the maximum cross-sectional length dimension of said opening.

An optional hinge or pivot joint 16 is typically included to allow insertion and yet a flexible positioning in the desired non-vertical position. The pivot joint includes a limit stop 17, which optionally is adjustable, an electrical connection 18, such as a flexible cable, and an arrangement for moving the radiating structure in position which might be a spring loading 19 (not shown in detail). Depending on the mechanical solution a locking device 20 may be included (not shown in detail). FIG. 1 shows an implementation of the invention with one radiating structure but farther below symmetric implementations with two similar radiating structures with a common pivot joint will be described.

The non-vertical antenna position enables a more efficient radiating structure. For instance, a horizontally oriented antenna producing radiation directed essentially vertically has a considerable higher antenna gain than a vertically mounted end-fire antenna of the same length.

The radiating structure is advantageously comprised of an antenna array structure or a leaky wave antenna structure. More about particular implementations of the radiating structure is described with reference to FIGS. 3–6.

In order to be mountable through the opening 12, the radiating structure 15 has obviously to be small enough to be insertable into the tank through the opening 12.

According to the present invention there is provided a method for mounting the antenna device 14, which includes that the antenna device 14 is inserted into the tank through the opening 12, that the elongated radiating structure 15 is oriented inclined with respect to the vertical plane; and that the antenna device 14 is connected to the radar-based level gauge 11 so that, during use of the radar-based level gauge, the antenna device 14 produces an essentially vertical radiation beam directed downwards in the tank.

In a fist version, the antenna device 14 is a rigid device (not illustrated in FIG. 1), where the radiating structure 15 is rotationally moved with respect to the vertical plane or translatively moved with respect to the horizontal plane during insertion.

In a second version, the antenna device 14 is provided with the pivot joint 16 so that the radiating structure 15 can be inserted into the tank through the opening 12 in an essentially vertical position, and then be oriented inclined by means of pivoting the radiating structure 15.

Different mechanical arrangements for pivoting and folding the radiating structure are known in the art. The mechanical arrangements may further be capable of locking the radiating structure in a desired off-vertical angle; indicating that locking has been performed; unlocking the radiating structure when the antenna device is to be removed; and adjusting and indicating the direction of the antenna, i.e. the azimuthal direction or the plane of the off-vertical angle. The electrical coupling can be a suitably protected flexible coaxial line, a flexible waveguide, a sliding joint, or a capacitive coupling.

The antenna device as depicted above may produce an essentially fan-like antenna pattern, which is narrow in one direction and wide in the perpendicular direction. This is well optimized if the antenna device 14 is turned, i.e. rotated, to use the narrow direction to suppress undesired fixed echoes from tank structure(s). For instance, for an opening located close to a side wall of the tank, the antenna device is preferably turned to produce the fan-like antenna pattern essentially parallel with the side wall to avoid reflexes from the side wall.

Figure 2A:
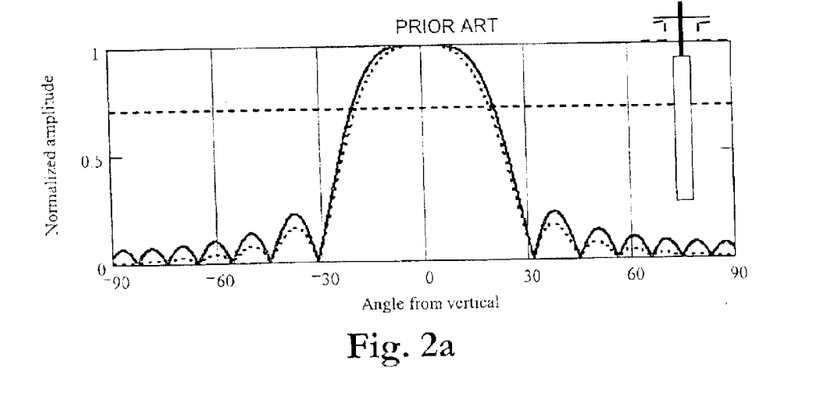
FIGS. 2a–c are schematic diagrams of the amplitude of the antenna pattern as produced as a function of the off-vertical angle for an ideal antenna array as mounted vertically, horizontally, and in an angle there between, respectively, but configured and fed to produce a vertical radiation beam.
Figure 2B:
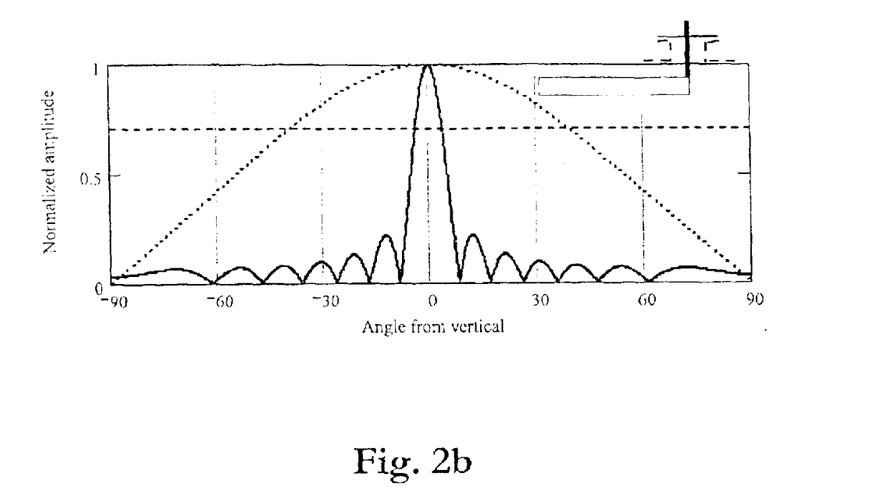
Figure 2C:
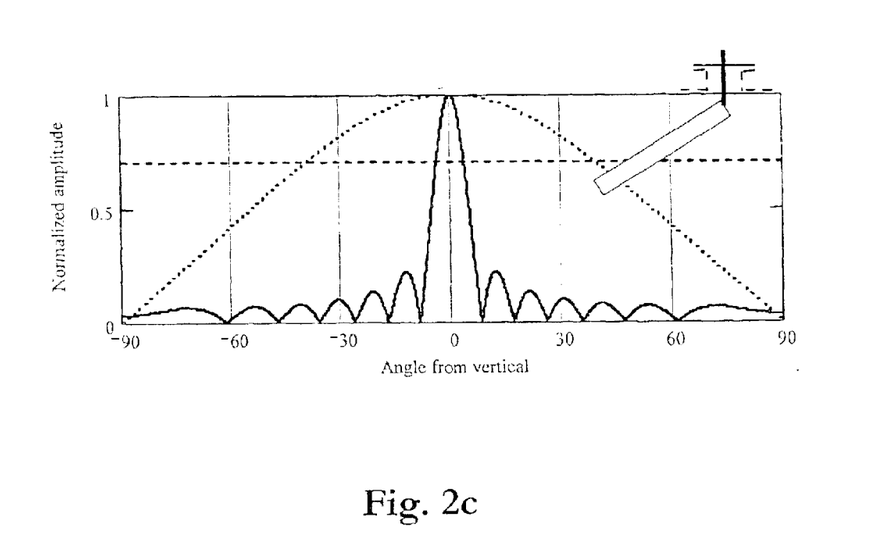

FIGS. 2a–c are schematic diagrams of calculated amplitude of an antenna pattern as produced as a function of the off-vertical angle for an ideal antenna array as mounted vertically (FIG. 2a), horizontally (FIG. 2b), and in an off-vertical angle $\alpha$ of 50° (FIG. 2c), respectively, but configured and fed to produce a vertical radiation beam. The wavelength is 52 mm corresponding to a frequency of 5.8 GHz, the length of the antenna array is 352 mm and the number of elements is 16 evenly spread over the length. The antenna orientation is schematically indicated in the schematic antenna illustration inset in the upper right corner of each Figure. The antenna pattern in the plane of the off-vertical angle $\alpha$ is shown by solid lines and the antenna pattern in the perpendicular plane is shown by dotted lines. The 3 dB level is indicated by dashed lines.

The antenna pattern has for the vertically oriented array 42°×39° lobe width (3 dB); for the horizontally oriented array 7°×78° lobe width (3 dB); and for the inclined array ($\alpha$=50°) 10°×47° lobe width (3 dB).

FIGS. 2a–c illustrate important points of the invention. Using the same size of the antenna element and the same diameter of insertion a considerable narrower radiation beam (⅙ in the example) and consequently a few dB higher antenna gain is obtained. It can also be observed that the most of this improvement is obtained already at the first 45° of the turning of the elongated radiating structure from the vertical position, which simplifies the mechanical construction of the pivot 16 and of the microwave transition.

In the case where a rather simple leaky waveguide structure is used, FIGS. 2a–c illustrate the fan-like shape of the radiation beam, while other and more complicated types of radiating structures can be created with narrower radiation beam and higher gain. Several kinds of implementation of the antenna device are possible. The radiating structure is preferably either an array structure or a leaky wave structure Three preferred specific groups of implementations of the radiating structure will be described below with reference to FIGS. 3–5 based on essentially circular pipes carrying radiating slots, elongated sheets carrying various array antennas, and radiating structures made of profiles acting as leaky wave antennas. As anyone skilled in the art realizes, there are other possible implementations of the antenna device, and these embodiments are merely examples to illustrate the principle of the present invention.

The first group of implementations of the radiating structure is schematically illustrated in FIGS. 3a–f, and is based on a steel pipe. Typically, this kind of radiating structure can be made very strong to withstand all kinds of tank environment.

Figure 3A:
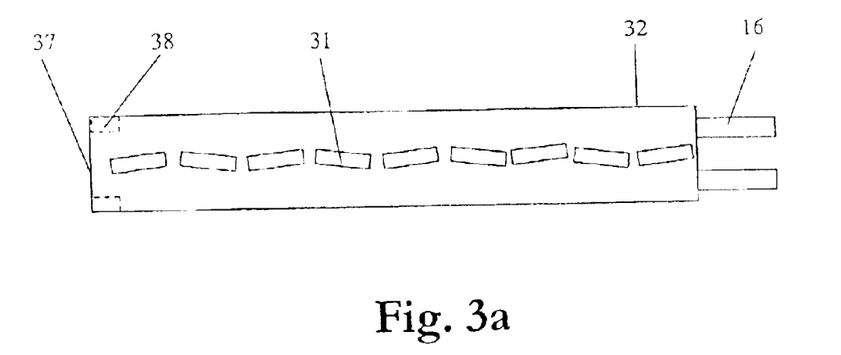
FIGS. 3a–e illustrate schematically, in side (FIGS. 3a, 3e) and end (FIGS. 3b–d) views, radiating structures according to a first preferred specific group of embodiments of the present invention.

FIG. 3a shows a steel pipe 32 having a length of 300–400 mm and a diameter of about 20–50 mm, and being provided with the pivoting mechanism 16 in its end. The diameter is connected to the wavelength of the microwave radiation used. A frequency of about 5.8 GHz is assumed, but of course other wavelengths and diameters may be used.

The steel pipe is provided with longitudinal slots 31 as radiating elements, the longitudinal slots 31 facing downwards when the structure is mounted. The electrical connection is not shown in FIG. 3a, but can be a coaxial cable, a flexible waveguide or some sliding metallic or capacitive connection.

Figure 3B:
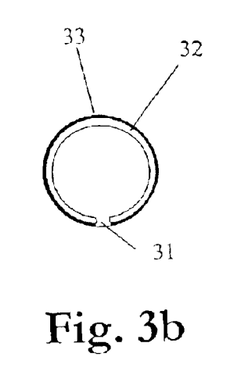
Figure 3C:
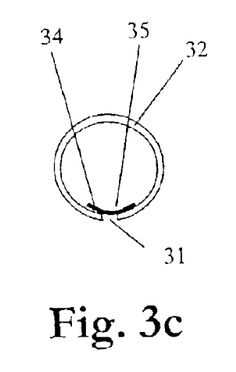
Figure 3D:
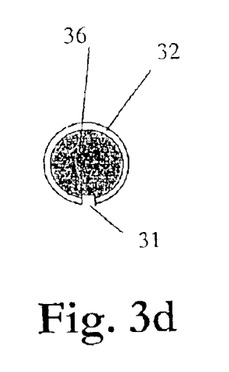
Figure 3E:
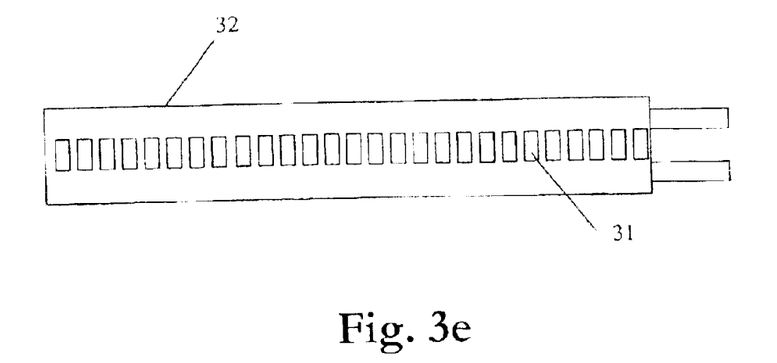

FIG. 3e illustrates schematically a steel pipe provided with circumferential slots. As is well known from the theory of radiation from slot antennas on a metallic cylinder longitudinal and circumferential slots are very different in function, see e.g. Antenna Engineering Handbook, Third edition, editor Richard C. Johnson, McGraw-Hill 1993, chapter 9, the content of which being hereby incorporated by reference.

The longitudinally slotted pipe (FIG. 3a) is similar to an arrangement with longitudinal slots in the broad side of a rectangular waveguide, and for the assumed frequency 5.8 GHz (corresponding to a wavelength of 52 mm) a pipe diameter of 40–45 mm is optimal to get a front-to-back ratio of the radiation pattern of about 15 dB. A smaller diameter is possible but the radiation properties will degrade. The pipe diameter is compatible with a circular single mode waveguide so the radiating structure is very similar to a conventional slotted rectangular waveguide. FIG. 3a shows slightly inclined λ/2-slots forming an array antenna.

In most cases the waveguide is preferably sealed by an exterior plastic tube 33 or an interior piece of plastic material 34 as shown in FIGS. 3b and 3c, respectively. It is also possible to fill the pipe entirely with plastic 36 as shown in FIG. 3d, but in this case the diameter and feeding arrangement must be adjusted accordingly. In the FIG. 3c embodiment it is possible to make the interior plastic of a printed circuit board with a conductor 35, where the printed circuit board is both a sealing and a feeding structure.

By the arrangement the feeding can be made different as compared to the waveguide feeding, e.g. to adjust the direction of the beam as compared to the orientation of the pipe 32. A sealing 37 at the end of the steel pipe 32 (see FIG. 3a) is typically employed, but depending on the environment a satisfactory function may also be obtained with a fully open pipe. A piece of carbon filled material 38 may be a part of the radiating structure to avoid disturbing reflections at the end of the pipe.

The circumferential slots of the FIG. 3e embodiment may be λ/2 slots (to obtain an array antenna), or may be shorter and more closely spaced (to obtain an leaky wave antenna). The inner diameter of the pipe (i.e. the feeding waveguide) and the dielectric material filling the pipe (air or a plastic like PTFE or PPS as illustrated in FIG. 3d) determine the angle α from the plumb-line to obtain vertical radiation. The circumferential slots can give a high front-to-back ratio already also when the diameter of the pipe is small: a 20–25 mm pipe can give about 12–14 dB front-to-back at 5.8 GHz.

When the circumferential slots are used for an array type of feeding the pipe is preferably mounted horizontally, or close thereto. An array type feeding similar to the embodiment of FIG. 3c with an interior transmission line 35 is one possibility to feed the circumferential slots.

Figure 4A:
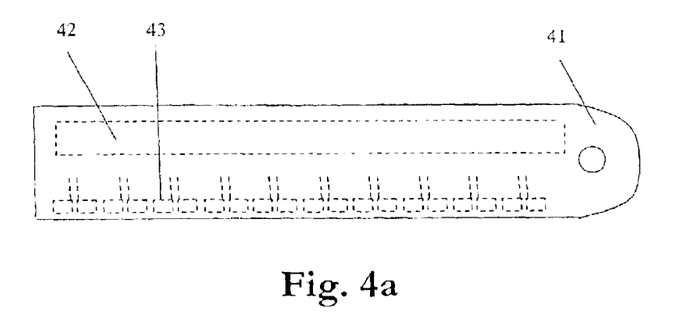
FIGS. 4a–f illustrates schematically, in side (FIGS. 4a–c) and end (FIGS. 4d–f) views, radiating structures according to a second preferred specific group of embodiments of the present invention.
Figure 4B:
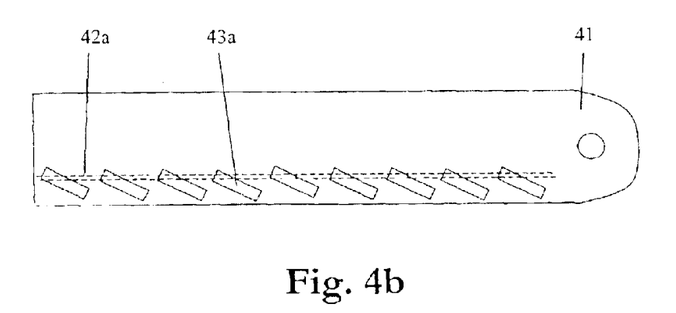
Figure 4C:
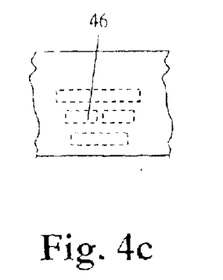
Figure 4D:
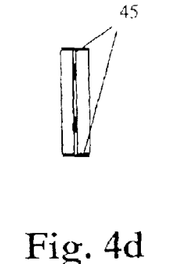

Another group of antennas structures suitable to implement the present invention is shown in FIGS. 4a–f and is based on an elongated sheet with essentially vertical flat sides. The sheet, denoted 41 in FIGS. 4a–b, is either made of a printed circuit board as shown in FIG. 4a including an array of radiating elements 43 and feeding lines 42, or is made a steel sheet provided with suitable perforation 43a as shown in FIG. 4b and possibly with an additional conductor 42a to obtain desired wave guiding and radiating function. In both cases an exterior plastic protection 45 may be added and may also be a part of the function for instance to support surface waves along the sheet, see the end view as illustrated in FIG. 4d. The width of the sheet is 20–50 mm for a use around 5.8 GHz, or otherwise scaled accordingly. Electrical connection can be provided as described above by a coaxial line. Mechanical devices for end-limiting stop, locking and maneuvering the movement during installation (spring-loading etc.) are not shown in FIGS. 4a–f, but may be provided in any manner.

The radiating elements 43a of the FIG. 4b embodiment are slots or notches. Typically, the additional conductor 42a is integrated in a protective enclosure or is attached to the radiating structure in any other manner to feed the slots 43.

FIG. 4c shows a portion of a printed circuit board based radiating structure including a small printed Yagi antenna 46 giving directional gain downwards and improved front-to-back ratio. The upper part of the printed circuit board contains the distribution circuit 42 (which is not shown in detail). Preferably the antenna is fed from the middle to minimize the difference in path-length to different antenna elements, which is important at very accurate distance measuring. A feeding from the end is simpler to realize and may be sufficient.

Each of the radiating structures as illustrated in FIGS. 4a–d may be arranged with its sheet surface such that a normal thereof is kept horizontal while the radiating structure is turned to obtain a suitable angle α (as is indicated by the pivots to the right in FIGS. 4a–b) or such that the surface normal is turned in a vertical plane while the radiating structure is turned to obtain a suitable angle α.

Figure 4E:
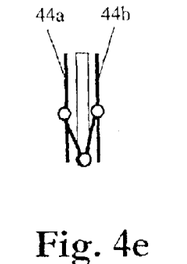
Figure 4F:
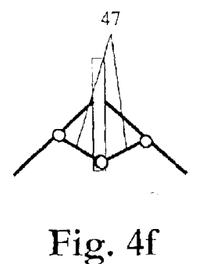

A more efficient way to increase the gain downwards is to use a foldable corner reflector 44a–b, which is spring-loaded and unfolded after insertion in the tank. FIG. 4e illustrates the radiating structure/corner reflector assembly folded for insertion in the tank and FIG. 4f illustrates the radiating structure/corner reflector assembly unfolded, arranged for use. Any of the radiating structures as shown in FIG. 4a–c may be used in this embodiment.

The reflector is constituted by two spring-loaded steel plates 44a–b arranged along the length of the radiating structure. The plates 44a–b, which by links 47, will arrive to the final unfolded position after insertion in the tank and may also be translated over the printed circuit board to a more favorable position when the corner reflector is unfolded so any distribution network will be outside of the corner-reflector. A mechanism must be included to ensure that the reflector is folded when the radiating structure is removed from the tank.

This radiating structure/corner reflector assembly is preferably arranged horizontally, or close thereto, in the tank with the reflector facing downwards. Particularly, if the roof of the tank is horizontal the radiating structure/corner reflector assembly may be slightly inclined with respect to the horizontal plane in order to avoid microwaves radiating from the backside of the radiating structure from being reflected in the roof back towards the antenna, which possibly could interfere with the microwaves reflected from the surface of the matter, of which the level is gauged.

Figure 5A:
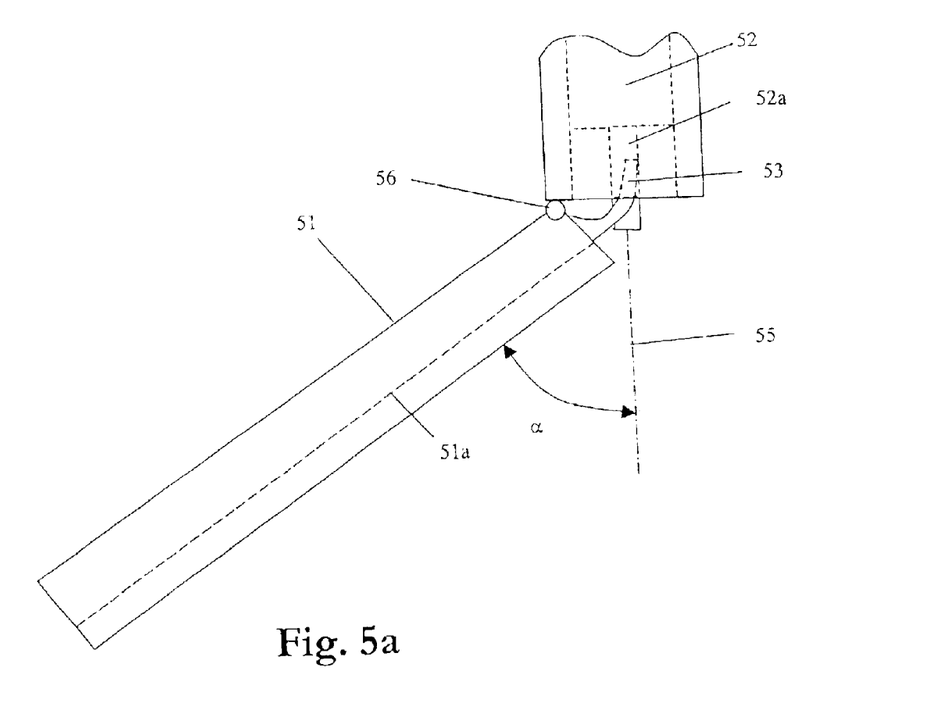
FIGS. 5a–b illustrate schematically, in side and end views, a radiating structure according to a third preferred specific group of embodiments of the present invention.
Figure 5B:
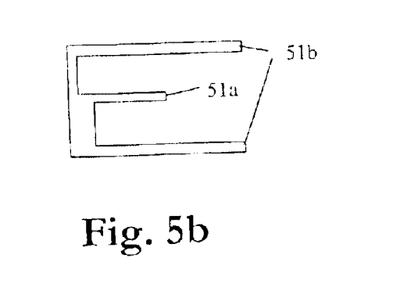

Next, with reference to FIGS. 5a–b, which illustrate schematically, in perspective and end views, a radiating structure, a third preferred group of specific embodiments of the invention will briefly be described.

A metallic waveguide 51 is formed to be a leaky wave antenna. The waveguide is a trough waveguide having a cross section resembling a capital E as is clearly shown in FIG. 5b. However, there are other leaky waveguide structures that may be used in the present invention.

The through leaky waveguide is designed to have a phase velocity $v_f$ higher than the velocity of light c. The radiating structure is preferably neither horizontally nor vertically arranged, but defines the angle α to the plumb-line 55, where α can be calculated as α=arc $\cos(c/v_f)$. If for example the trough waveguide is operating at 1.41 times its cut-off frequency α will be 45°. A large angle α is preferred to obtain narrow lobes and avoiding grating lobes.

The trough waveguide 51a–b can be seen as a distorted coaxial line, where the center conductor is supported by a quarter-wave fin 51a and an opened screen conductor 51b. Due to this, the connection can be realized by a direct transition from the center fin 51a of the trough waveguide to a coaxial line 52. In order to simplify the sealing, the step over the coaxial line 52 inside the tank can be avoided by a capacitive coupling 53 from the center fin 51a to a conductor 52a hidden behind a dielectric sleeve. By using a quarter wave coupling, a secure coupling can be implemented. The outer profile 51b is connected to the surrounding conductor of the coaxial feed line 52 via a pivot 56.

A sliding connection can be used as an alternative to the capacitive or quarter wave coupling. This conductor is the end of a coaxial line leading up from the tank to the electronics of the gauge.

Further details regarding leaky wave antennas may be found in Antenna Engineering Handbook, Third edition, Editor: Richard C. Johnson, McGraw-Hill 1993, chapter 10, the content of which being hereby incorporated by reference.

Figure 6A:
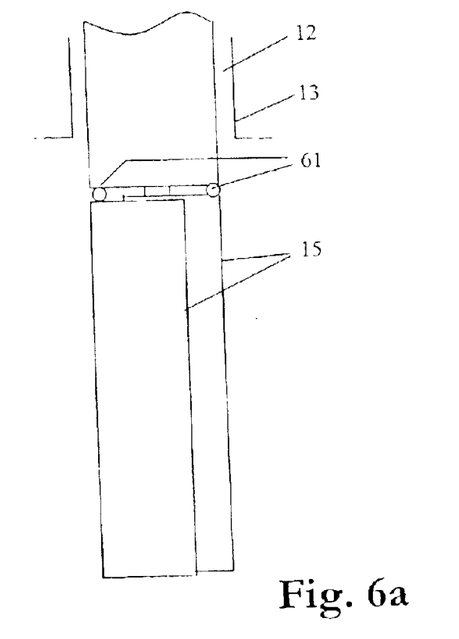
FIGS. 6a–b illustrate schematically, in folded and unfolded side views, respectively, radiating structure according to a fourth preferred specific group of embodiments of the present invention.
Figure 6B:
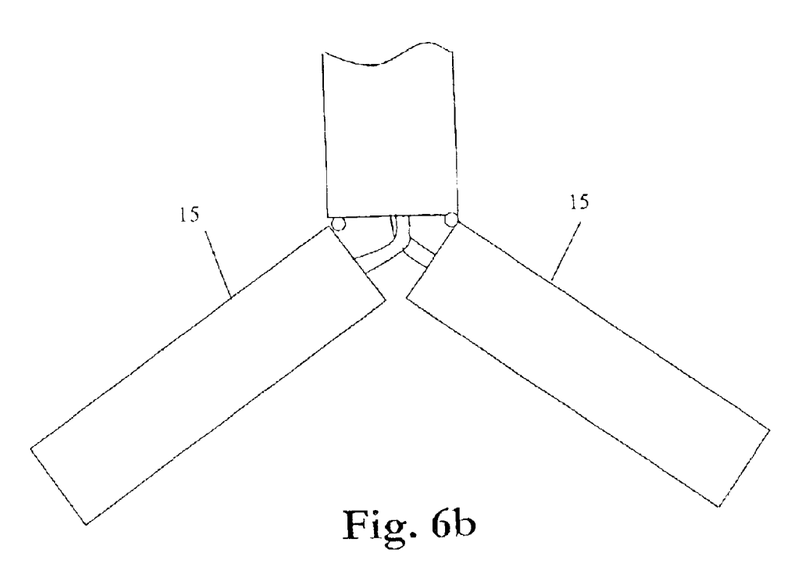
Figure 6C:
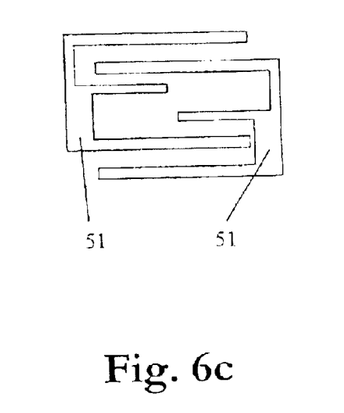
FIG. 6c illustrates schematically, in a folded end view, an example of a profile of the radiating structure of FIGS. 6a–b.

Finally, FIGS. 6a–b illustrate schematically, in folded and unfolded side views, respectively, a radiating structure according to a fourth preferred specific embodiment of the present invention. This radiating structure comprises two foldable antenna parts 15 joined by a pivot (or pivots) 61. When being inserted through the opening 12 of the roof 13 of the tank the parts are folded (FIG. 6a) and when a final vertical position is reached, the foldable antenna parts 15 are unfolded by means of the pivot(s) 61 (FIG. 6b). Each of the antenna parts 15 may be comprised of the radiating structure as illustrated in FIGS. 3a–d or the radiating structure as illustrated in FIGS. 5a–b. In FIG. 6c is schematically illustrated, in a folded end view, the embodiment of FIGS. 6a–b when each of the antenna parts is comprised of the leaky wave antenna structure of FIGS. 5a–b.

The symmetric structure will improve the antenna pattern and as the peak to peak horizontal length is the critical measure the leaky wave antenna structures can be made shorter for a given lobe width.

It shall further be appreciated that an antenna device of the present invention may comprise three or four foldable elongated radiating structures.

It shall still further be appreciated that while prior art antennas for radar level gauging have all a mechanical axis of symmetry associated with their radiating structure, which coincides with the symmetry axis of radiation (e.g. for a planar structure this axis is the normal of the surface of the planar structure and for an end-fire rod antenna structure the axis coincides with the longitudinal axis of the rod), the radiating structure of the present invention has, provided that the angle α is not 0°, a mechanical axis of symmetry which differs from the vertical symmetry axis of the radiation produced.

In the typical design as described above the radiating structure is mechanically essentially straight, but with reference to the well known design of conformal arrays there is no basic obstacle in designing the radiating structure to another shape than a straight one. Depending on the tank design this may simplify the insertion of the radiating structure into the tank for instance by producing it with a bent shape.

By such design it can even be possible to simplify the mechanics by avoiding the pivot and still gain the advantages typical for the invention. For instance the sheet type of radiating structure can have the printed circuit board modified to include delay lines adjusted to give a feeding with correct phase to give the desired focused vertical beam. In this connection the sheet has not necessarily vertical sides and such a turning would make it possible to bend the printed circuit board to enable a bent design.

The leaky wave type of antenna is possible to adjust for non-straight design by changing the waveguide parameters for non-linear delay progression along the radiating structure. Other array antennas or leaky waveguides can be modified accordingly to enable for instance a mechanically bent design.

What is claimed is:

1. An antenna device for a radar-based level gauge mounted at an opening in a roof of a tank, said antenna device comprising at least one elongated radiating structure
   (i) having a length, which is substantially larger than three times a maximum cross-sectional length dimension of said opening;
   (ii) being small enough to be inserted into said, tank through said opening;
   (iii) being oriented in a non-vertical position; and
   (iv) being configured and fed to produce an essentially vertical radiation beam directed downwards in said tank.

2. The antenna device of claim 1 wherein the length of said at least one elongated radiating structure is larger than four times the maximum cross-sectional length dimension of said opening.

3. The antenna device of claim 1 wherein the maximum cross-sectional length dimension of said opening is smaller than a wavelength of said essentially vertical radiation beam.

4. The antenna device of claim 1 wherein the frequency of said essentially vertical radiation beam is about 6 GHz, and said opening is a hole having a diameter less than 2".

5. The antenna device of claim 1 wherein said one elongated radiating structure is comprised of a straight structure.

6. The antenna device of claim 5 wherein said radar-based level gauge is mounted at an opening in the roof of the tank, which opening is located close to a side wall of the tank, and said antenna device produces said fan-shaped antenna pattern essentially parallel with said side wall.

7. The antenna device of claim 1 wherein said at least one elongated radiating structure is provided with at least one pivot in order to be capable of being oriented in said non-vertical position after having been inserted into said tank through said opening in an essentially vertical position.

8. The antenna device of claim 1, wherein said essentially vertical radiation beam directed downwards in said tank has a fan-like shape.

9. The antenna device of claim 8 wherein said angle is larger than about 45°.

10. The antenna device of claim 1 wherein said at least one elongated radiating structure is oriented with an angle with respect to a vertical position, which angle deviates significantly from 0°.

11. The antenna device of claim 1 wherein said at least one elongated radiating structure is oriented with an angle with respect to a vertical position, which angle deviates significantly from 90°.

12. The antenna device of claim 1 wherein said at least one elongated radiating structure is oriented in or close to a horizontal position.

13. The antenna device of claim 1 wherein said at least one elongated radiating structure is comprised of an antenna array.

14. The antenna device of claim 13 wherein said antenna array is linear.

15. The antenna device of claim 13 wherein said antenna array is comprised of an array of directional antennas.

16. The antenna device of claim 15 wherein said array of directional antennas is printed on a circuit board.

17. The antenna device of claim 13 wherein said antenna array is comprised of a metal sheet provided with slots and a feeding conductor.

18. The antenna device of claim 17 comprising a corner reflector structure.

19. The antenna device of claim 18 wherein said corner reflector structure is foldable.

20. The antenna device of claim 13 wherein said antenna array is comprised of a tube provided with an array of slots.

21. The antenna device of claim 20 wherein said slots are covered by a dielectric.

22. The antenna device of claim 1 wherein said at least one elongated radiating structure is comprised of a leaky wave antenna.

23. The antenna device of claim 22 wherein said leaky wave antenna is comprised of a tube provided with an array of closely spaced slots.

24. The antenna device of claim 22 wherein said leaky wave antenna is comprised of a metallic profile.

25. The antenna device of claim 24 wherein said metallic profile is an asymmetric E-profile.

26. The antenna device of claim 1 comprising two foldable elongated radiating structures.

27. The antenna device of claim 1 comprising four foldable elongated radiating structures.

28. A radar-based level gauge comprising the antenna device of claim 1.

29. The antenna device of claim 1 wherein said at least one elongated radiating structure is provided with, and fed via, an electrical connection.

30. The antenna device of claim 29 wherein said electrical connection is a coaxial line.

31. The antenna device of claim 29 wherein said at least one elongated radiating structure is adapted to be fed by a current via said electrical connection.

32. The antenna device of claim 1 wherein said at least one elongated radiating structure is provided with, and fed via, a waveguide connection.

33. The antenna device of claim 1 having only a single foldable elongated radiating structure.

34. The antenna device of claim 1 having exactly two foldable elongated radiating structures.

35. The antenna device of claim 1 wherein said at least one elongated radiating structure is configured and fed to radiate radiation in an essentially vertical radiation beam directed downwards in said tank.

36. A method for mounting an antenna device for a radar-based level gauge, said antenna device including at least one elongated radiating structure, comprising the steps of:
  inserting said antenna device into a tank through an opening in a roof thereof, wherein the at least one elongated radiating structure of said antenna device has a length, which is substantially larger than three times a maximum cross-sectional length dimension of said opening;
  orienting the at least one elongated radiating structure of said antenna device in a non-vertical position; and
  connecting said antenna device to said radar-based level gauge so that, during use of said radar-based level gauge, said antenna device produces an essentially vertical radiation beam directed downwards in said tank.

37. The method of claim 36 wherein the maximum cross-sectional length dimension of said opening, through which said antenna device is inserted into said tank, is smaller than a wavelength of said essentially vertical radiation beam, which said antenna device produces during use of said radar-based level gauge.

38. The method of claim 36 wherein said antenna device is a rigid device, and said at least one elongated radiating structure is rotationally or translatively moved in the step of inserting.

39. The method of claim 36 wherein said antenna device is provided with at least one pivot for pivoting said at least one elongated radiating structure, and said at least one elongated radiating structure is oriented in said non-vertical position by means of pivoting said at least one elongated radiating structure.

40. The method of claim 36 wherein said antenna device produces an antenna pattern having a fan-like shape, and said at least one elongated radiating structure is oriented to suppress echoes from structures of said tank.

41. The method of claim 36 wherein said opening is located close to a side wall of said tank, and said at least one elongated radiating structure is oriented to produce said fan like antenna pattern essentially parallel with the side wall of said tank.

42. The method of claim 36 wherein said at least one elongated radiating structure is oriented with an angle with respect to a vertical position, which angle deviates significantly from 0°.

43. The method of claim 36 wherein said at least one elongated radiating structure is oriented with an angle with respect to a vertical position, which angle deviates significantly from 90°.

44. The method of claim 36 wherein said at least one elongated radiating structure is oriented with an angle with respect to a vertical position, which angle is larger than about 45°.

45. The method of claim 36 wherein said at least one elongated radiating structure is oriented in or close to a horizontal position.

46. The method of claim 36 wherein the length of said at least one elongated radiating structure is larger than three times the maximum cross-sectional length dimension of said opening.

47. The method of claim 36 wherein said at least one elongated radiating structure is comprised of an antenna array or a leaky wave antenna.

48. The method of claim 36 wherein said at least one elongated radiating structure is connected to said radar-based level gauge so that, during use of said radar-based level gauge, said at least one elongated radiating structure is fed via an electrical connection.

49. The method of claim 48 wherein said electrical connection is a coaxial line.

50. The method of claim 48 wherein said at least one elongated radiating structure is connected to be fed by a current via said electrical connection.

51. The method of claim 36 wherein said at least one elongated radiating structure is connected to said radar-based level gauge so that, during use of said radar-based level gauge, said at least one elongated radiating structure is fed via a waveguide connection.

52. An antenna device for a radar-based level gauge mounted at an opening in a roof of a tank, said antenna device comprising a leaky wave antenna structure
  (i) having a length, which is substantially larger than three times a maximum cross-sectional length dimension of said opening;

(ii) being small enough to be inserted into said tank through said opening;

(iii) being oriented in a non-vertical position; and (iv) being configured and fed to produce an essentially vertical radiation beam directed downwards in said tank.

53. The antenna device of claim 52 wherein the length of said leaky wave antenna structure is larger than three times the maximum cross-sectional length dimension of said opening.

54. The antenna device of claim 53 wherein the maximum cross-sectional length dimension of said opening is smaller than a wavelength of said essentially vertical radiation beam.

55. The antenna device of claim 54 wherein said opening is a hole, and said maximum cross-sectional length dimension is the diameter of said hole.

56. The antenna device of claim 52 wherein said leaky wave antenna structure is provided with, and fed via, an electrical connection.

57. The antenna device of claim 56 wherein said electrical connection is a coaxial line.

58. An antenna device for a radar-based level gauge mounted at an opening in a roof of a tank, said antenna device comprising an array antenna structure (i) having a length, which is substantially larger than three times a maximum cross-sectional length dimension of said opening;

(ii) being small enough to be inserted into said tank through said opening;

(iii) being oriented in a non-vertical position; and (iv) being configured and fed to produce an essentially vertical radiation beam directed downwards in said tank.

59. The antenna device of claim 58 wherein the length of said array antenna structure is larger than three times the maximum cross-sectional length dimension of said opening.

60. The antenna device of claim 59 wherein the maximum cross-sectional length dimension of said opening is smaller than a wavelength of said essentially vertical radiation beam.

61. The antenna device of claim 60 wherein said opening is a hole, and said maximum cross-sectional length dimension is the diameter of said hole.

62. The antenna device of claim 52 having only a single foldable elongated radiating structure.

63. The antenna device of claim 52 having exactly two foldable elongated radiating structures.

64. The antenna device of claim 52 wherein said leaky wave antenna structure is configured and fed to radiate radiation in an essentially vertical radiation beam directed downwards in said tank.

65. The antenna device of claim 58 wherein said array antenna structure is provided with, and fed via, an electrical connection.

66. The antenna device of claim 65 wherein said electrical connection is a coaxial line.

67. The antenna device of claim 65 wherein said array antenna structure is adapted to be fed by a current via said electrical connection.

68. The antenna device of claim 58 wherein said array antenna structure is provided with, and fed via, a waveguide connection.

69. The antenna device of claim 58 having only a single foldable elongated radiating structure.

70. The antenna device of claim 58 having exactly two foldable elongated radiating structures.

71. The antenna device of claim 58 wherein said array antenna structure is configured and fed to radiate radiation in an essentially vertical radiation beam directed downwards in said tank.

* * * * *